US005702802A

United States Patent [19]

Rettker et al.

[11] Patent Number: 5,702,802

[45] Date of Patent: Dec. 30, 1997

[54] PERMANENT XEROGRAPHIC TONER-RECEPTIVE INDEX DIVIDER

[75] Inventors: James Palmer Rettker, Glenwood; William Edward Peterson, Elgin; Philip Bonn Chandler, Tinley Park; John Howard Lee, Palatine, all of Ill.

[73] Assignee: Avery Dennison Corporation, Pasadena, Calif.

[21] Appl. No.: 446,686

[22] PCT Filed: Dec. 6, 1993

[86] PCT No.: PCT/US93/11804

§ 371 Date: Jul. 26, 1995

§ 102(e) Date: Jul. 26, 1995

[87] PCT Pub. No.: WO94/13493

PCT Pub. Date: Jun. 23, 1994

Related U.S. Application Data

[63] Continuation-in-part of Ser. No. 989,091, Dec. 11, 1992, Pat. No. 5,407,234.

[51] Int. Cl.[6] .......... B32B 23/02

[52] U.S. Cl. .......... 428/192; 428/195; 428/213; 428/411.1; 283/81

[58] Field of Search .......... 285/81; 283/39, 283/81; 428/195, 411.1, 913, 192, 213

[56] References Cited

U.S. PATENT DOCUMENTS

| | | | |
|---|---|---|---|
| 4,071,362 | 1/1978 | Takenaka et al. . | |
| 4,085,245 | 4/1978 | De Vito et al. . | |
| 4,240,848 | 12/1980 | Barber | 156/64 |
| 4,415,626 | 11/1983 | Hasenauer et al. . | |
| 4,477,548 | 10/1984 | Harasta et al. . | |
| 4,480,003 | 10/1984 | Edwards et al. . | |
| 4,510,225 | 4/1985 | Kuehnle et al. . | |
| 4,523,776 | 6/1985 | Barber | 283/39 |
| 4,526,847 | 7/1985 | Walker et al. . | |
| 4,592,954 | 6/1986 | Malhotra . | |
| 4,678,687 | 7/1987 | Malhotra . | |
| 4,865,914 | 9/1989 | Malhotra . | |
| 5,104,721 | 4/1992 | Sun . | |
| 5,104,731 | 4/1992 | Gager . | |
| 5,126,763 | 6/1992 | Atherton et al. . | |
| 5,135,261 | 8/1992 | Cusack et al. | 285/81 |
| 5,137,773 | 8/1992 | Malhotra . | |
| 5,139,903 | 8/1992 | Malhotra . | |
| 5,190,805 | 3/1993 | Atherton et al. . | |
| 5,208,093 | 5/1993 | Carls et al. . | |
| 5,215,814 | 6/1993 | Gager et al. . | |
| 5,242,888 | 9/1993 | Atherton et al. . | |
| 5,260,140 | 11/1993 | Malhotra . | |
| 5,310,591 | 5/1994 | Dodge et al. . | |
| 5,310,595 | 5/1994 | Ali et al. . | |
| 5,382,641 | 1/1995 | Kawate . | |
| 5,401,058 | 3/1995 | Holmberg . | |
| 5,407,234 | 4/1995 | Rettker et al. . | |

*Primary Examiner*—William Krynski

*Attorney, Agent, or Firm*—Oppenheimer Poms Smith

[57] ABSTRACT

An index divider is reinforced using a polymer film having a bonding coating on one side thereof for bonding the polymer film to the index divider and a toner receptive polymer coating on the other side thereof.

1 Claim, 1 Drawing Sheet

PERMANENT XEROGRAPHIC TONER-RECEPTIVE INDEX DIVIDER

CROSS-REFERENCE TO RELATED APPLICATIONS

This application is a continuation-in-part of application Ser. No. 07/989,091, now U.S. Pat. No. 5,407,234, filed Dec. 11, 1992 and a 371 of PCT/US 93/11804, Dec. 6, 1993 by the inventors under the same title.

FIELD OF THE INVENTION

This invention relates to index tab assemblies where the index tabs are integral with index sheets, and are reinforced.

BACKGROUND OF THE INVENTION

When material, including index tabs, are xerographically copied, sometimes plain index sheets are used, and sometimes the index sheets are mounted with reinforcing at the high-wear index tabs area. When plain index sheets are used, there is normally no problem with copying, and relatively good toner adherence is present. However, without reinforcing, the tabs often wear out or are accidentally torn off. When an attempt is made to image xerographically onto index sheets wherein the index tabs are reinforced with a high strength plastic film (e.g. a polyester such as Mylar), the toner often does not adhere to the tabs, and there are often deletions or poor adhesion of the toner printing onto the tabs so that the printing is soon scraped away.

By way of background, it is noted that one conventional technique for adhering the plastic reinforcing to the index sheets involves the use of a heat and pressure adhesive coating (e.g. modified polyolefin) on the plastic sheet material, and subsequent securing of the plastic reinforcing to the index tab of the index sheets, under heat and pressure, with an adhesive coating bonding the plastic reinforced tabs to the heavy paper index sheets at a temperature of about 210° or 220° F.

Another technique for adhering a polyester or other plastic to the index tab is shown in U.S. Pat. No. 5,135,261 which discloses forming index tab indicia separately on a label, and then securing the printed label onto the reinforced index tab by pressure sensitive adhesive. A coating on the label surface permits adhesion of xerographic toner to the label. In some cases, as an alternative, the index sheets may have file indicia pre-printed onto the index tab, and subsequently have the reinforcing applied over the pre-printed tabs. However, this method requires advance planning, and, flexibility in printing new indicia on the index tabs is lost.

Accordingly, a principal object of the present invention is to provide a coating directly on a reinforced index tab, which will not interfere with the securing of the plastic reinforcing to the index sheet, and which will be xerographic toner receptive, and where the resulting printing is resistant to abrasion.

SUMMARY OF THE INVENTION

In accordance with one illustrative embodiment of the invention, a permanent xerographic toner-receptive index assembly includes an index sheet having a reinforced index tab with a high strength plastic film bonded at least to the tab area of the index sheet. The reinforced index tab has a polymer coating thereon, which may be glossy with a glass transition temperature (GTT) at which the polymer becomes less hard and brittle, somewhat below the xerographic toner fusing temperature, whereby the polymer coating forms a strong bond with xerographic toner applied thereto, and the polymer coating with toner applied thereto has a high abrasion resistance, capable of withstanding 100 double passes of an ASTM Gardner scrape adhesion tester with a 500 gram weight applied thereto, without significantly impairing the toner bond to the index tab.

The polymer coating should also retain its integrity up to a temperature of 200° F., or higher, so that, as the high strength reinforcing plastic film is heat laminated to the heavy paper index sheets, the polymer coating does not come off or cause the plastic film to wrap around the rollers used in bonding the film to the index sheets. One high strength plastic film which may be used is polyethylene terephthalate, or "PET", which is a polyester film sold under various trade names and trademarks, including Mylar, for example.

From a production standpoint, it is desirable to apply the toner receptive coating to the high strength plastic film while the film is still in bulk rolls, the stage where a conventional bonding coating such as a modified polyolefin is also applied to the other side of the film. However, as mentioned above, as the film is applied to the paper index sheets (following cutting the reinforcing film, etc.), with heat and pressure, the toner receptive coating on the other side of the film must retain its integrity, and should not stick to, or cause the reinforcing film to, wrap around the rollers, at the temperature of approximately 210° F. or 220° which is used in this process.

One polymer coating which satisfies the needs as outlined above is poly (n-butylmethacrylate), such as one sold under the DuPont trade name Elvacite 2044. It has a glass transition temperature of approximately 59° F. Further, it retains its integrity at temperatures in the vicinity of 210° F. or higher so that it does not adversely affect the process involving the bonding of the polyester film to the heavy paper index sheet. While other solvents may be employed, a combination of 40 wt. % Methyl Ethyl Ketone (or 2-Butanone), 40 wt. % Toluene, with 20 wt. % of the Elvacite, has been used. If desired, a small proportion such as 5–15 wt. % of polyketone could be added to promote the adhesion of the toner. This ketone based synthetic resin is available from Lawter International as Krumbhaur K1717. The resultant toner-receptive polymer coating has a high gloss appearance, and measures 85% on a Byk Chemie Tri Gloss Meter. In this regard, a measurement of 25–35% would be considered to be a matte finish, with progressively increasing glossiness toward higher Byk Chemie Tri Gloss Meter measurement figures.

It was noted above that it is desirable that the glass transition temperature of the toner-receptive coating be somewhat below the fusion temperatures of the toner in a high speed xerographic copier. It is understood that the heated rollers in a high speed xerographic copier apparatus may be at temperatures between 150° F. and 190° F., such as 170°, as measured by a temperature tape passed through the copier. However, with the toner coated paper moving through the copier at relatively high speed, the effective fusing temperature is substantially lower, probably between 100° F. and 150° F. or between 120° F. and 140° F. Accordingly, the toner-receptive polymer should have at least one major component having a glass transition temperature below 150° F. and preferably below 120° F. Concerning another aspect of the situation, it is sometimes desirable from an aesthetic standpoint that the index tabs have a glossy appearance. The glass transition temperature should therefore be close to room temperature so that the index tab continues to have a glossy appearance in normal usage at room temperatures following the adherence of the toner to the toner-receptive coating. Accordingly, it is appropriate for the glossy coating to have a GTT between about 45° F. and 150° F. or preferably about 90° F. or 100° F. to 150° F.

Another acceptable polymer coating includes a combination of 35 parts of a vinyl polymer available as VYES from Union Carbide and 30 parts polyketone available under stock number K1717 from Lawter International. The Union Carbide VYES polymer is a copolymer of vinyl chloride and vinyl acetate having hydroxyl pendant groups. It has a glass transition temperature of 107° F. The Lawter product is ketone based synthetic resin, and is an adhesion promoter.

A third acceptable polymer coating includes a combination of Goodyear P.E. 200 and Goodyear P.E. 307 resin chips. The optimum coating would include primarily P.E. 307 (GTT-57° F.), with a small proportion of P.E. 200 (GTT-153° F.) which is a somewhat harder polymer to raise the effective glass transition temperature and softening point of the P.E. 307 polymer.

Another formulation which may be used is 50% of the Union Carbide VYES polymer noted above, and 50% of a Union Carbide VMCC polymer, formed of polyvinyl chloride having pendant carboxyl groups. With the VYES having a GTT of 107° F. and the VMCC having a GTT of 160° F., the combination had good toner adherence, with either the VYES GTT or the average GTT being low enough to provide good toner adherence.

In all of the last-mentioned examples, the same solvents as mentioned above may be used.

The coatings as mentioned above provide a glossy appearance but will still provide xerographic toner acceptance and bonding, without substantial deletions, and high resistance to abrasion.

As used herein, the terms "microscope penetration points", or "microscopic discontinuities" or "microscopic adherence points" refer to penetration points or discontinuities which are so close together on the surface of documents that toner adherence to these penetration points or discontinuities will present printed letters and images which appear to be continuous, with no blank areas or deletions.

It has been noted above that a toner receptive glossy polymer coating may be provided by selecting a material which has a suitable relatively low glass transition temperature, below the temperature at which toner is fixed in xerographic copiers, and where the coating has stability and retention of integrity at least up to about 210° F.

It has also been discovered that the inclusion of finely divided particulate material forming a matte finish polymer coating will also provide microscopic discontinuities or penetration points to which the toner will firmly bond or adhere, to form an abrasion resistant image. One coating which meets the necessary criteria is disclosed in the prior U.S. Pat. No. 5,135,261, cited above, and assigned to the assignee of this invention.

This coating is formed of (by weight) 14.3 parts finely divided aluminum oxide pigment particles, 18.7 parts P.E. 200 resin chips sold by Goodyear, 33.5 parts methyl ethyl ketone, and 33.5 parts toluene, with the last two materials being solvents. The finely divided aluminum oxide ($Al_2O_3$) particles provide the microscopic discontinuities or penetration points in the polymer surface to which the toner forms a strong bond. Other particulate material, or pigments, such as titanium oxide may be employed instead of the aluminum oxide. It is noted in passing that the glass transition temperature for the P.E. 200 resin chips from Goodyear is about 150° F. to 160° F., above the normal effective toner fusing temperature in xerographic imagers, but the toner still makes a good bond in view of the microscopic discontinuities provided by the finely divided particulate material. It is further noted that this coating maintains its integrity above the 210° F. temperature at which the polyester (or Mylar) reinforcing is bonded to the paper index sheets, so that there is no interference with this process, despite coating the polyester (or Mylar) films on both sides prior to this bonding step. Instead of aluminum oxide, barium sulfate, titanium oxide or other inorganic fillers or particulate material may be used; and particle size small enough to pass through a 2 micron mesh screen, is sufficiently fine.

The presently most preferred polymer coatings of composition of the present invention are as follows:

| Ingredient | Parts by Weight |
|---|---|
| I | |
| Methyl-ethyl-ketone | 32.50 |
| Methyl-isobutyl-ketone | 32.50 |
| Elvacite 2044 | 7.30 |
| Vinyl resin (VYES) | 21.90 |
| Barium Sulfate particles* | 5.80 |

*Particle size is 2 microns or less obtained from Whittaker under the trade name 2278 Dry Blanc Fixe Imported.

| Ingredient | Parts by Weight |
|---|---|
| II | |
| Methyl-ethyl-ketone | 19.55 |
| Methyl-isobutyl-ketone | 19.55 |
| UCD-160* | 49.10 |
| Piccolastic A-75** | 6.55 |
| Barium Sulfate particles | 5.25 |

*Copolymer of Methyl and Butyl Methacrylate from Morton (TGG = 122° F.).

**Polystyrene from Hercules (Softening Point = 175° F.).

As can be appreciated, the preferred polymers include poly (lower alkyl methacrylate), vinyl resins, polystyrenes and combinations thereof.

Accordingly, in accordance with another aspect of the invention, a permanent xerographic toner receptive index assembly may include an index sheet having a reinforced index tab extending from the sheet, the index tab including a high strength plastic film bonded to the index sheet, and a polymer coating on the reinforced index tab, said polymer coating having microscopic discontinuities or adherence points along the surface thereof to form a strong bond with toner applied thereto, said polymer coating retaining its integrity to above 200° F. to avoid interfering with the bonding of the high strength plastic film to the index sheet. Further, the polymer coating with toner bonded thereto preferably has a high abrasion resistance capable of withstanding 100 double passes of a Gardner scrape abrasion tester with a 500 grams weight applied thereto without significantly impairing the toner bond to the index tab.

In accordance with a further aspect of the invention, permanent xerographic toner-receptive index dividers may be formed by the following method:

1. Bulk rolls of a high strength reinforcing film such as a polyester film material are coated on one side with a heat and pressure sensitive bonding coating.
2. The polyester film material is coated on the other side with a xerographic toner-receptive polymer coating having microscopic toner penetration or adherence points, with the polymer coating having high temperature qualities so that it maintains its integrity up to temperatures above 200° F.

3. The polyester film material is then cut to the desired final size to reinforce index sheets or dividers including an index tab extending from a sheet.
4. The polyester film is bonded to the index sheets or dividers, with the bonding coating in engagement with the index sheets or dividers and using pressure and temperature applied at temperatures above 200° F., to reinforce the index sheets or dividers.
5. Printing on the reinforced indexed sheets including printing on the exposed areas of the polyester film which have the toner-receptive polymer coating thereon, using electrostatic forces and toner in the course of the printing step.
6. Subjecting the index tabs to abrasion in the course of the normal use of the index sheets, with the coating having toner bonded thereto having a high abrasion resistance.

In one of the preferred embodiments, those portions of the index sheet which are intended to be reinforced (e.g., the index tabs) are indented so that the final index divider or sheet will be substantially flat. For example, the index tabs are indented sufficiently so that the thickness of the polyester film material, the adhesive and the toner-receptive polymer coating composition is substantially the same as the indentation so that the index sheet (including the reinforced index tabs) is substantially the same thickness. This has been found to aid toner receptivity and prevent deletions and increase adhesion of the toner to the reinforced index tabs.

We have also found that deletions are kept to a minimum if the total thickness of the polyester film, adhesive and polymer coating is less than about 2 mil thick and preferably less than about 1.5 mil thick—generally speaking, the thickness of the polyester film should be less than about 1.2 mil (the indention is normally 1.2 mil or less), preferably less than 1 mil and more preferably about 0.75 mil. The thickness of the adhesive will be from about 0.3 to 0.7 mil and the thickness of the polymer coating will range from about 0.1 to about 0.3 mil.

The invention also preferably includes applying the reinforcing polyester film to both sides of the index divider.

In accordance with another feature of the invention, the application of the reinforcing film to the index sheets may involve the use of a large number of heated rollers, which may be coated with Teflon to reduce the possibility of the toner receptive coating sticking to the rollers.

DETAILED DESCRIPTION OF THE PREFERRED EMBODIMENTS OF THE INVENTION

Figure 1:
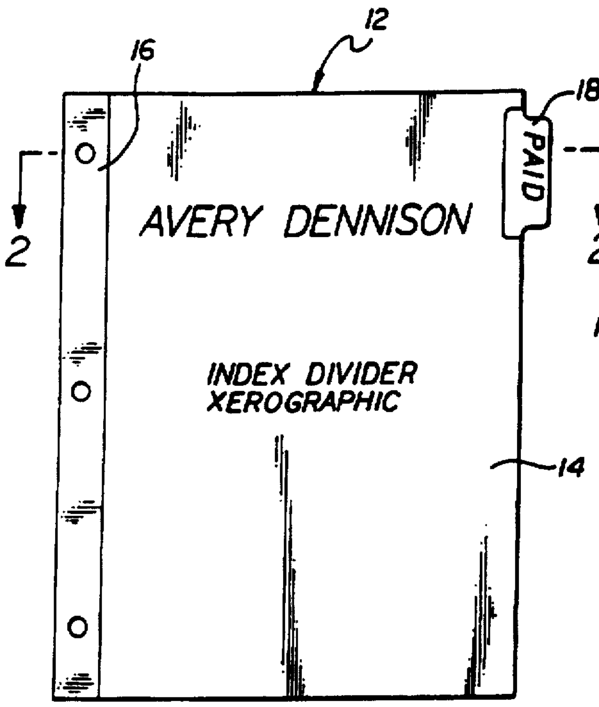
FIG. 1 shows an index divider illustrating the principles of the present invention.
Figure 2:
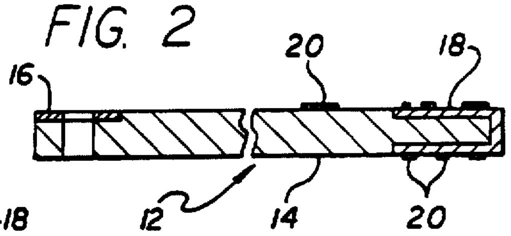
FIG. 2 is a cross-sectional view taken along lines 2—2 of FIG. 1, with the thickness of the sheet being increased for clarity of presentation.

Referring more particularly to the drawings, FIGS. 1 and 2 show an index divider sheet 12 formed of a main body 14 which may, for example, be a heavy paper of perhaps about 8 mils thick, with high strength polyester film 16, 18, reinforcing the binding edge, and the index tab area, respectively, on opposite sides of the sheet 14. On the outer surface of the reinforcing film material 18 is a very thin layer of a toner-receptive polymer coating of the type described in some detail hereinabove. On the inner surface of film material 16 is a thin layer of adhesive. On the upper and lower surfaces of the index sheet assembly 12 is fused toner 20 which adheres to the area 18 which has been reinforced by the polyester reinforcing film having the toner-receptive coating thereon.

Figure 3:
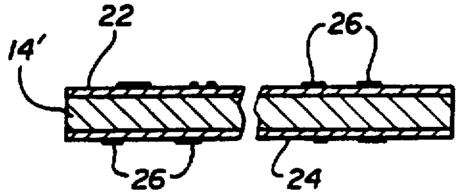
FIG. 3 shows an alternative embodiment of the invention in which the entire surfaces of both sides of the index sheet have reinforcing film applied thereto.

FIG. 3 shows an alternative embodiment of the invention in which the central index divider 12 is fully reinforced by the upper polyester layer 22, and the lower polyester layer 24. Thee polyester reinforcing layers 22 and 24 have an external coating of a toner-receptive polymer in order to ensure good bonding of the printing 26 to the upper and lower surfaces of the assembly.

Figure 4:
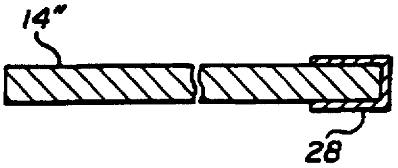
FIG. 4 shows a further alternative embodiment of the invention in which the reinforcing material is not recessed into the index divider.

FIG. 4 shows a further alternative embodiment in which the index sheet 14" is provided with the polyester reinforcing film 28 only in the index tab area. In FIG. 4, the reinforcing film 28 is not recessed into the index divider body, as in the case of the index divider body 14 of FIG. 2. In this regard, it is noted that the configuration as shown in FIG. 2 is to be preferred, as toner transfer and adhesion are better with substantially no deletions and the index divider or index sheets will lay flat, when in a stack, for easier feeding through a xerographic copying machine. The recessing is accomplished by an additional method step whereby the normal heavy paper index sheet material is compressed in those areas where the reinforcing polyester film is to be applied. With the depth of compression being substantially equal to the thickness of the polyester film, adhesive and polymer coating the resultant index tab divider has a substantially constant thickness.

Concerning dimensions, in one preferred embodiment, the main heavy paper body of the index tab dividers may be approximately 8 mils thick, and the polyester reinforcing film material may be approximately 0.75 mils thick. This may be compared with the normal thickness of 2 or 3 mils for a sheet of paper. With reference to FIG. 2, therefore, the main central area of the index sheet 14 would be 8 mils thick, and the right hand edge as shown in FIG. 2 would be compressed to 5.6 mils thick and the left hand edge to 6.8 mils so that with the double thicknesses of the films 16 and 18, as shown, the entire index divider assembly will have a uniform thickness of approximately 8 mils. Concerning the embodiment of FIG. 3, a somewhat thinner reinforcing film 22, 24, may be employed for the full coating on both sides of the index divider, and these films are preferably about 1 mil thick. The normal size of the index divider sheets involves a body size approximately 11"×8½", with a 2"×½" tab added, making the overall size approximately 11"–9". Although a fairly heavy paper sheet of approximately 8 mils is normally preferred, of course other thicknesses of paper or light cardboard may be employed. The polyester film thickness can vary from about 0.5 to about 5 mils. Concerning the thicknesses of the adhesive coating which serves to bond the polyester reinforcing film to the paper and the thickness of the toner-receptive polymer coating, both of these coatings are very thin, normally less than 7 mil. More specifically, the toner-receptive coating is very thin, normally about 0.1 to 0.3 mils and the adhesive coating is normally about 0.3 mils to 0.7 mils thick.

Concerning the overall process of forming the index divider sheet assemblies shown in FIGS. 1–4, the polyester reinforcing film is initially coated on one side with the toner-receptive polymer coating. As mentioned above, one preferred formulation for applying the coating to the polyester reinforcing film involves using appropriate solvents such as methyl-ethyl-ketone and methyl-isobutyl-ketone in which there is dissolved a copolymer of methyl and butyl methacrylate and polystyrene in the proportions as set forth hereinabove. This is normally accomplished with the polyester in large rolls, for example, at least 20" in width. In the course of this process, the solvents of course evaporate from the film, leaving the toner-receptive polymers in a very thin coating on the polyester reinforcing material, on one side thereof. The next step is the application of an adhesive coating which is extruded onto the polyester on the opposite side of the polyester reinforcing film from the toner-receptive coating which has been previously applied thereto. This coating step may be performed by Protect-All, Inc., P.O. Box 10, 109 Badger Road, Darien, Wis. 53114.

The bonding of the adhesive coated polyester reinforcing to the heavy paper index divider is a well known process and involves the cutting of the polyester reinforcing bulk sheet material into appropriate areas as indicated in FIGS. 1–4 of the present drawings, and applying them under heat and pressure to the index sheets. This is accomplished in a known type of machine involving a large number of chrome rollers which are heated and which apply heat and pressure to the reinforcing film, with the adhesive coating in engagement with the paper index sheets, and the toner-receptive coating exposed. The process involves the application of heat in the area of about 210° F. to 220° F., with a large number of heated rollers in engagement with the toner-receptive coating, on both sides of the index divider assembly. Accordingly, this coating must retain its integrity at these temperatures. If the coating does not retain its integrity at these temperatures, the toner-receptive coating may be impaired, or may stick to the rollers, so that the reinforcing film doe snot properly bond to the main body of the heavy paper index sheets, or the toner-receptive coating may be lost. The machine used is a so-called ARC machine, and has fourteen rollers on each side of the index sheets and reinforcing film, which are spring loaded to apply pressure to the film and index sheets. The rollers are preferably coated with Teflon to reduce the possibility of the toner-receptive coating sticking to the rollers. The letters "ARC" stand for Automatic Roll Celluloider, and the machine is made by E.Z. Machine Co. of Mineola, N.Y. The overall process for securing reinforcing of film to index dividers has been accomplished for a number of years by the Avery Dennison Specialty Products Division, 1601 Rohlwing Road, Rolling Meadows, Ill. 60008. In addition, the bonding of reinforcing polyester material to index dividers has been performed by a number of other companies, so the process of bonding these polyester films (uncoated on the opposite side) is a well-known process.

Figure 5:
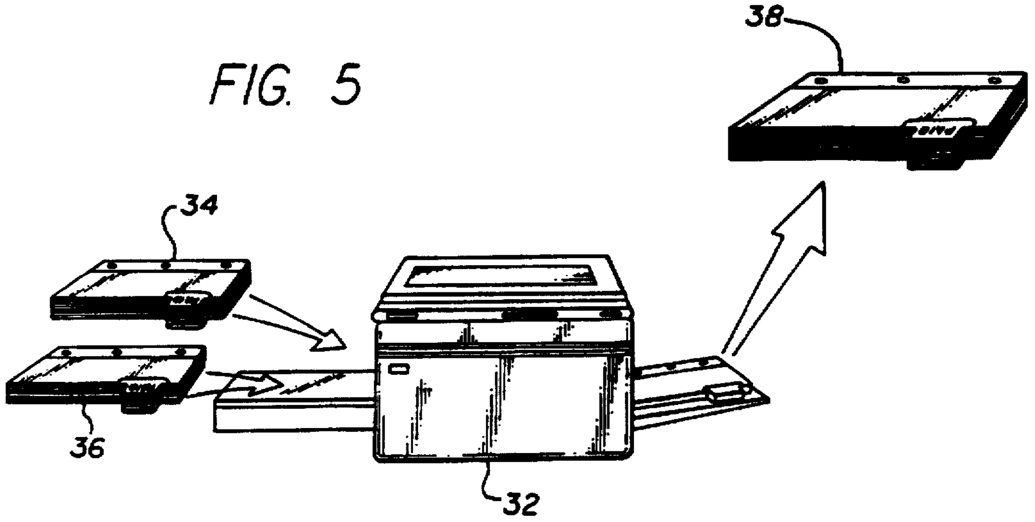
FIG. 5 is a diagrammatic showing of a xerographic copier in which printing is accomplished on both the main portion of the index divider and also on the reinforced areas of the index divider where a toner-receptive coating is present.

Returning now to the drawings, FIG. 5 shows diagrammatically a high speed xerographic imager 32, with printed index dividers to be imaged indicated at 34, and blank index dividers 36 of the type shown in FIGS. 1–4 forming a "paper supply". Following the imaging process, the resultant printed index dividers are indicated schematically at 38, in FIG. 5. Thus, instead of requiring pre-printing in advance of the reinforcing step, or the use of separate labels, the dividers in accordance with the present invention may be simply copied in a routine manner providing reinforced printed dividers as simply as the copying of regular typed material onto regular xerographic copying paper. Further, as desired, a client can have a matte finish on the reinforced areas through the use of particulate material in the toner-receptive coating; or, alternatively, where a glossy tab is preferred, a polymer having the appropriate glass transition temperature may be employed.

All of the coatings specifically mentioned hereinabove have a high resistance to abrasion, and the xerographically printed indicia, using toner, is still legible following 100 double passes of a Gardner scrape adhesion tester, with a 500 gram weight supplied thereto. However, for the purposes of the present specification and claims, "high abrasion resistance" is defined as the capability of withstanding 50 double passes of a Gardner scrape adhesion tester, with a 250 gram weight applied thereto.

In the foregoing specification, specific methods, formulations, and constructions have been specifically disclosed. However, it is to be understood that variations still accomplishing the same result are within the scope of the present invention. Thus, by way of example and not of limitation, papers and coatings of different thicknesses may be employed, and other size index card and sheets may be employed, with particular emphasis on all of the various sizes of index cards currently available. In addition, the reinforcing may be applied only to the index area, to both the index area and the binding edge, or to the entire surface and/or surfaces of the index sheets. Also, with regard to the coating of the two sides of the polyester reinforcing film, the order of the two coating steps may be interchanged from that specifically mentioned hereinabove. Accordingly, the present invention is not limited to the precise constructions, materials, or process steps as listed hereinabove.

What is claimed is:

1. A permanent xerographic toner-receptive index sheet assembly, comprising:

an index sheet;

a reinforced index tab extending from said sheet, said index tab being formed of plastic film having a thickness of from about 0.5 mils to about 5 mils and adhesively bonded to said index sheet;

said index tab having a polymer coating directly applied thereto, said coating having a glass transition temperature at which the polymer becomes less hard and brittle below the effective xerographic copier toner fusing temperature, but retaining its integrity at temperatures at least as high as 200° F.;

said reinforced index tab with polymer coating applied thereto being of substantially the same thickness as said index sheet, whereby the coating forms a bond with xerographic toner applied thereto; and said coating with toner bonded thereto having high abrasion resistance capable of withstanding 50 double passes of an ASTM Gardner Scrape Adhesion Tester with a 250 gram weight applied thereto, without significantly impairing the toner bound to the reinforced index tab.

* * * * *